(12) United States Patent
Ebbecke

(10) Patent No.: US 7,033,086 B2
(45) Date of Patent: Apr. 25, 2006

(54) DEVICE FOR COUPLING LIGHT INTO AN OPTICAL CONDUCTOR

(75) Inventor: Andreas Ebbecke, Stutensee-Büchig (DE)

(73) Assignee: Schott AG, Mainz (DE)

( * ) Notice: Subject to any disclaimer, the term of this patent is extended or adjusted under 35 U.S.C. 154(b) by 103 days.

(21) Appl. No.: 10/728,384

(22) Filed: Dec. 5, 2003

(65) Prior Publication Data

US 2004/0114880 A1 Jun. 17, 2004

(30) Foreign Application Priority Data

Dec. 5, 2002 (DE) ............................... 102 57 128

(51) Int. Cl.
*G02B 6/42* (2006.01)
(52) U.S. Cl. .............................. 385/88; 385/90; 257/98
(58) Field of Classification Search ............ 385/88–90, 385/147; 257/98
See application file for complete search history.

(56) References Cited

U.S. PATENT DOCUMENTS 6,832,861 B1 * 12/2004 Kragl ......................... 385/88

FOREIGN PATENT DOCUMENTS

| DE | 695 12 347 T2 | 5/1996 |
| DE | 698 02 293 T2 | 6/2000 |
| EP | 0 712 014 A1 | 5/1996 |
| WO | 98/36295 | 8/1998 |

* cited by examiner

*Primary Examiner*—Frank G. Font
*Assistant Examiner*—Michael P. Mooney
(74) *Attorney, Agent, or Firm*—Laurence A. Greenberg; Werner H. Stemer; Ralph E. Locher

(57) ABSTRACT

A device for coupling light into an optical conductor has an optical light element, preferably having an LED, for generating light. The optical light element has a light-guiding body with a luminous surface and forms a housing and in which a photoelectric material is disposed in a reflector. An optical conductor is provided and has a light-receiving surface onto which the light can be projected. The luminous surface has a coupling region corresponding directly to the receiving surface of the optical conductor and which is free from additional optical elements. The reflecting surface of the reflector focuses the light onto the coupling region of the luminous surface and/or onto the receiving surface of the optical conductor. Therefore, the light emitted by the photoelectric material is radiated only onto the coupling region and the coupling efficiency is increased, and it is possible to use cost-effective optical conductors of small diameter.

12 Claims, 2 Drawing Sheets

DEVICE FOR COUPLING LIGHT INTO AN OPTICAL CONDUCTOR

BACKGROUND OF THE INVENTION

FIELD OF THE INVENTION

The invention relates to a device for coupling light into an optical conductor. The device has an optical light element for generating light, which has a light-guiding body that is provided with a luminous surface and forms a housing and in which a photoelectric material is disposed in a reflector and is connected to electric terminals for power supply. The optical conductor has a light-receiving surface onto which light can be projected. The invention also contains a light-emitting diode (LED) for use in the device. The LED has a base that has electric terminals and is configured in an illuminating direction as a reflector with a reflecting surface. A housing surrounds the photoelectric material disposed in the reflector and connected to the terminals. The housing is connected to the base and has a luminous surface.

Devices and light-emitting diodes of the type described above are known in the prior art. Devices of the the type are used for data transmission in telecommunications engineering in conjunction with optical conductors, such as glass or plastic fibers. In this case, electronic signals from the optical light element, preferably from laser diodes or LEDs, are converted into light pulses and fed into the optical conductor. The optical conductor can therefore be used to transmit the data for further processing to a terminal where it is reintroduced as electronic signals into an electronic circuit, as a rule through reverse transmission by photodiodes, or is used directly as light, for example for illumination.

Such systems have not only proved themselves for data transmission in networks, but also for lighting technology, and are used both in machines, in particular in motor vehicles, as small networks, but also in telecommunications engineering as well as in various other technical fields, since the transmission of the light in optical conductors is largely free from electromagnetic, thermal and similar interferences.

The light-emitting diodes of the prior art usually have a base provided with electric terminals. The base is configured in the illuminating direction as a reflector with a reflecting surface. Disposed in the reflector is a photoelectric material that is connected to the electric terminals of the base for the purpose of receiving power. Moreover, the base is at least partially surrounded by a housing in which the reflector with the photoelectric material is accommodated together with its terminal connections. The housing has a luminous surface via which the emitted light is radiated to the optical conductor.

Depending on the purpose or on the field of technical use for the transmission of light, it is possible in this case to make use as optical conductors of single mode fibers (SMFs) and in particular fiber bundles made from SMFs, but also of individual fibers having relatively large dimensions, made from glass or plastic.

The interface between the light-generating light element and the optical conductor has always proved to be problematical with such devices, since substantial energy losses can occur there. Various devices have been proposed in the prior art in order to optimize the coupling of the light, emitted from the light element, into a fiber configuration. The known devices in this case make use of configurations of lenses and/or diaphragms which can be both integrated in the housing or in the receiving surface of the optical conductor, and can be arranged separately. The configurations focus the light, emitted by the luminous surface of the housing, onto the receiving surface of the optical conductor such that as much light as possible can be fed into the optical conductor at a predetermined angle.

German Patent DE 695 12 347 T2 describes a configuration of a terminal for an optical conductor with an improved receiving surface. In this case, a lens of partial spherical configuration is integrated in the receiving surface of the optical conductor. DE 698 02 293 T2 proposes a configuration that has at least one lens between the luminous surface of the light element and the receiving surface of the optical conductor. Both configurations of the prior art have the disadvantage that the production entails substantial effort and thus costs, and the coupling between the light element and the optical conductor is highly susceptible to damage simply because of the small dimensions of the lens. However, the efficiency of the configurations is impaired by the energy losses at the additional optical elements in the beam path.

It has been shown furthermore, that in the case of devices of the prior art coupling light optimally requires the optical conductor to have a diameter that is at least similar if not greater than the housing of the light-emitting diode, since otherwise the light available at the luminous surface cannot be completely coupled into the optical conductor, and additional energy losses therefore occur.

SUMMARY OF THE INVENTION

It is accordingly an object of the invention to provide a device for coupling light into an optical conductor that overcomes the above-mentioned disadvantages of the prior art devices of this general type, which ensures that light is coupled into the optical conductor efficiently from the light element, and with the aid of which it is possible to reduce the diameter of the optical conductor used. It is also an object of the invention to provide a corresponding light-emitting diode for use in the device according to the invention.

With the foregoing and other objects in view there is provided, in accordance with the invention, an optical device. The optical device contains an optical conductor having a light receiving surface onto which light can be projected, and an optical light element for generating the light transmitted to the optical conductor. The optical light element contains a light-guiding body functioning as a housing having a luminous surface. The luminous surface has a coupling region corresponding directly to the light receiving surface of the optical conductor and is free of additional optical elements. A reflector has a reflecting surface for focusing the light onto the coupling region of the luminous surface of the housing and/or the light receiving surface of the optical conductor. Electric terminals are provided for supplying power and are disposed in the housing. A photoelectric material is disposed in the reflector and is connected to the electric terminals. The photoelectric material generates the light.

A solution is provided according to the invention by virtue of the fact that the luminous surface on the housing has a coupling region that corresponds directly to the receiving surface of the optical conductor and which is free from additional optical elements, and that the reflecting surface of the reflector focuses the light onto the coupling region of the luminous surface on the housing and/or onto the receiving surface of the optical conductor. Owing to the configuration according to the invention, the light emitted by the photoelectric material is radiated by a reflector only onto a part of the luminous surface of the housing, the coupling region. The coupling region is in this case assigned to the receiving surface of the optical conductor, the diameter of the optical conductor having substantially the dimensions of the coupling region, the optimum optical conductor having a somewhat larger diameter than the coupling region.

The light is reflected onto the reflecting surface by the reflector while still in the housing in such a way that it is focused in the coupling region of the luminous surface. The light is therefore received with maximum radiant energy by the optical conductor disposed directly with the receiving surface at the coupling region, without the occurrence of unnecessary losses.

It is provided, furthermore for this purpose that the reflecting surface of the reflector has a geometry by which the light emitted by the photoelectric material is projected at a predetermined angle onto the coupling region of the luminous surface and/or onto the receiving surface of the optical conductor, preferably at an angle which is most favorable optically for reception in the optical conductor. Since the light striking the receiving surface would be reflected in the case of unfavorable irradiation angles, it is provided according to the invention that the light is projected onto the receiving surface of the optical conductor at an optimum angle for light entry by a predetermined configuration of the reflecting surface. It is thereby possible also to dispense with additional optical elements for correcting the light beam, and so it is possible to avoid both expensive production of the device and a reduction in the optical power fed into the optical conductor because of the additional elements. Mathematical models are known for determining the optimum reflector geometry, and suitable reflecting surfaces can be determined using them by incorporating the dimensions of the relevant parts of the light-emitting diode and the configuration and dimensions of the optical conductor as well as of the optical spectrum.

It has proved to be advantageous in this case that the reflecting surface of the reflector is of a parabolic or elliptic shape. An advantageous result of the shape of the reflecting surface is that the aperture angle of the light beam and therefore, at the same time, the coupling region of the luminous surface can be kept small. It is therefore also possible to use optical conductors of small diameter, and this delivers substantial cost advantages by comparison with devices of the prior art.

It is provided with one development according to the invention that the coupling region forms a substantially flat area corresponding to the opening of the reflector, and that the receiving surface of the optical conductor is disposed in a plane-parallel fashion relative to the coupling region. The coupling region and the receiving surface can in this case be directly adjacent. However, it is also possible for there to be disposed between the coupling surfaces an interspace that contains a transparent medium such as air, for example. It is provided in this case that the coupling region is located in the immediate vicinity of the opening of the reflector of the reflector. It has proved to be advantageous for the coupling region to be disposed directly at the opening so as to lose as little as possible of the light radiated from the reflector.

It has proved to be particularly suitable in this case that the optical conductor contain at least one optical fiber, preferably made from glass or plastic. A single fiber can be used according to the invention, in particular for illuminating purposes. Bundles of glass or plastic fibers that form at the end a common receiving surface for receiving the light have proved to be particularly advantageous.

It is provided, furthermore, that the diameter of the optical conductor corresponds to the area of the coupling region. In this case, the optical conductor preferably has a somewhat larger diameter than is prescribed by the aperture angle of the reflector or by the coupling region. This ensures that the light losses due to scattered radiation remain low.

One embodiment according to the invention is provided by virtue of the fact that the luminous element for generating the light is a light-emitting diode (LED).

Furthermore, the invention contains a light-emitting diode for use in the device. The light-emitting diode has a base that is configured as a reflector with a reflecting surface in the illuminating direction. In the other direction, the base generally has terminals with the aid of which the light-emitting diode can be fastened on the electronic components provided therefor, such as printed circuit boards and the like. A photoelectric material is disposed in the reflector and connected to the terminals. The configuration is surrounded by an optically conducting body that forms a housing that has a luminous surface.

It is provided according to the invention that the reflecting surface of the reflector is bounded by the base rim and that the coupling region of the luminous surface is constructed at the smallest possible spacing from the base rim, preferably as a flat area parallel to the reflector opening. This advantageous configuration ensures that the luminous surface of the housing is disposed optimally in front of the reflector opening for coupling to the optical conductor. It can thereby be ensured that the connecting wires between the photoelectric material and the terminals of the base are potted in the housing, and therefore protected. It is also achieved that the radiation lost by scattering in the housing of the light-emitting diode remains small, since the radiation path in the housing is short. The light-emitting diode according to the invention can be produced in a simple way employing conventional methods, and thus cost-effectively.

Other features which are considered as characteristic for the invention are set forth in the appended claims.

Although the invention is illustrated and described herein as embodied in a device for coupling light into an optical conductor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
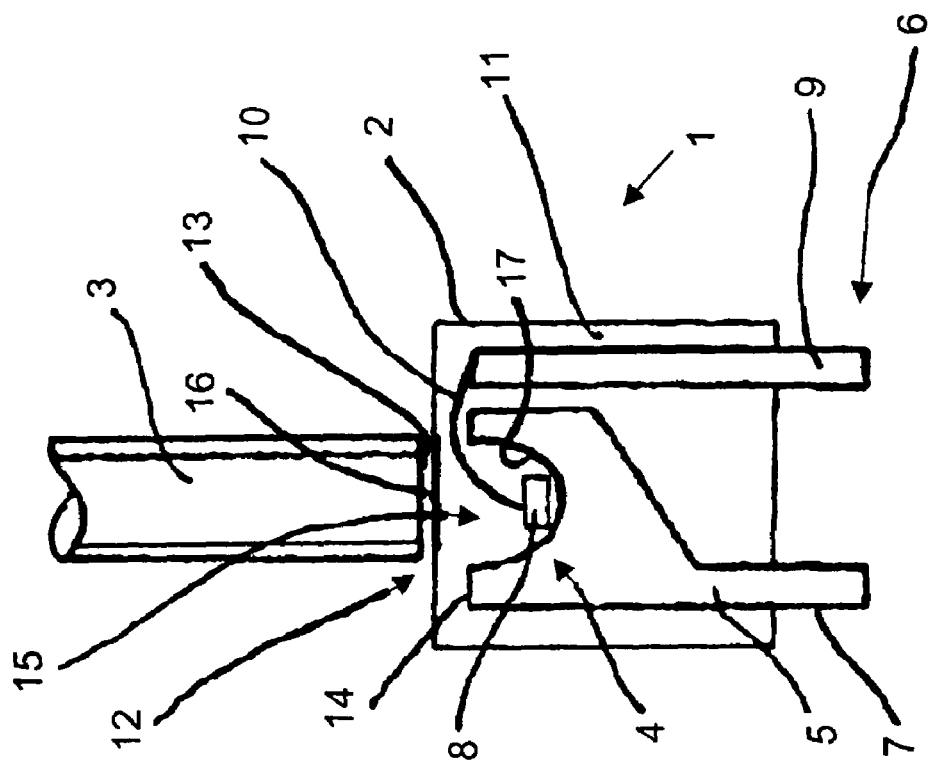
FIG. 1 is a diagrammatic illustration of a device according to the invention with a conventional reflector.

Referring now to the figures of the drawing in detail and first, particularly, to FIG. 1 thereof, there is shown a device 1 according to the invention having an LED 2 and an optical conductor 3. The LED 2 has a conventional reflector 4 that has a funnel-shaped configuration. The reflector 4 is configured in one piece on a first part 5 of a base 6 of the LED 2, which is constructed as an electric terminal 7 on the side opposite the reflector 4.

Disposed in the reflector 4 is a luminous chip 8 formed of a photoelectric material, which emits light upon being supplied with energy. The photoelectric material 8 is connected in an electrically conducting fashion to the terminal 7 via the reflector 4. On the other hand, it is connected in an electrically conducting fashion to a terminal 9, there being provided for this purpose a connecting wire 10 that produces the electrical connection between the terminal 9 of the LED 2 and the photoelectric material 8.

The two terminals 7 and 9 are disposed fixedly with one another in a housing 11, preferably being potted in the housing 11. The housing 11 is formed of a transparent, optically conducting material, preferably plastic or glass.

The housing 11 has a luminous surface 12 that is assigned a receiving surface 13 of the optical conductor 3. According to the invention, the luminous surface 12 is a substantially planar surface that is disposed in the immediate vicinity of a base rim 14, which is formed by the rim defining a reflector opening 15.

The luminous surface 12 has a coupling region 16 disposed opposite the receiving surface 13 of the optical conductor 3. The receiving surface 13 is preferably directly adjacent to the coupling region 16. The coupling region 16 is formed in this case by the beam geometry of the light reflected by the reflector 4 onto the luminous surface 12. The dimensioning of the coupling region 16 is therefore prescribed directly by the geometry of the reflector 4, which determines the aperture angle of the light beam.

It has proved to be particularly advantageous in the configuration of the device 1 according to the invention that it is possible to increase the quantity of light that can be coupled into the optical conductor 3, since the losses, which predominantly constitute scattering losses in the housing 11, can be kept low with particular efficiency because of the short path between the base rim 14 and the coupling region 16. The efficiency with which the light is coupled into the optical conductor 3 can thereby be increased at least twofold.

The task of the reflector 4 is to deflect the light emitted in all directions by the luminous chip 8 into only one direction. Given a funnel-shaped reflector surface 17 illustrated, the result in this case is a beam geometry with an aperture angle of approximately 150° full angle. The reflector 4 usually has an aperture diameter of 1 mm, and the housing 11, which is preferably configured as a plastic sheath, has a diameter of 5 mm, for example.

The plastic sheath itself, or else the interspace between the coupling region 16 and receiving surface 13 of the optical conductor 3 can be configured according to the invention free of lens and diaphragms, and so with conventional dimensioning of the base 6 and the housing 11 of the LED 1 the emitted light beam has a beam diameter in the coupling region 16 that corresponds approximately to the aperture diameter of the reflector aperture.

It is advantageous in this case according to the invention that the diameter of the optical conductor 3 can be of correspondingly small dimensions, it thereby being possible to make substantial material savings by comparison with conventional devices of this type.

Figure 2:
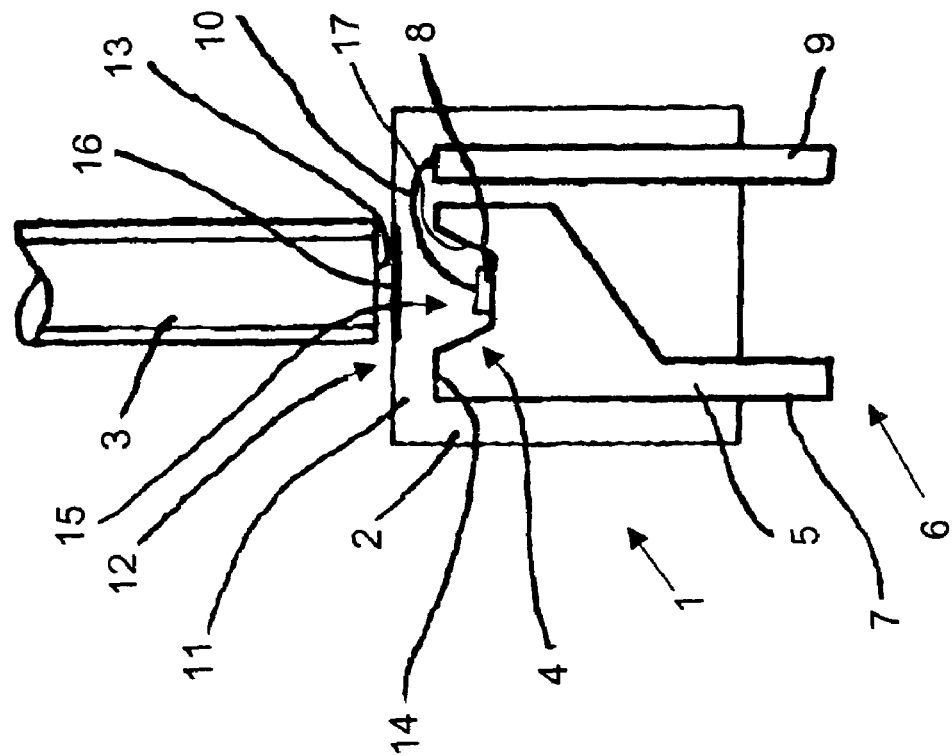
FIG. 2 is a diagrammatic illustration of the device according to the invention with a modified reflector.

The device 1 according to the invention with a modified reflector surface 17 is illustrated in FIG. 2. The reflector surface 17 is of a parabolic shape in this case, it thereby being possible to reduce the aperture angle of the light beam.

It can therefore be achieved according to the invention that a by far greater proportion of emitted light is coupled into the optical conductor 3.

By contrast with the conventional, funnel-shaped reflector surface 17, it is therefore possible for more than 50% of the light radiated onto the luminous surface 12 to be coupled into the optical conductor 3, as a result of which the efficiency of the device 1 can be further improved. Moreover, it is possible further to reduce large diameters of the optical conductors 3 which, on the one hand, entail high material costs and which are associated with a corresponding reduction in the luminance. This is achieved by virtue of the fact that the coupling region 16 is reduced by the selected geometry of the reflector 4 and/or of the reflecting surface 17. This renders it possible to focus the light emitted by the LED 2 according to the invention onto as small a diameter as possible while simultaneously increasing the luminance.

It is of particular advantage in this case that optical conductors 3 with a diameter in the range of 1 mm can be used, it being possible in essence for the entire light emitted by the photoelectric material to be coupled into the optical conductor 3. Smaller diameters of the optical conductors 3 likewise can be implemented given appropriate dimensioning of the required size of the luminous chip 8 and/or of the minimum quantity of photoelectric material required.

Of course, the device according to the invention can be optimized by a conventional configuration of additional lenses or reflectors that are inserted into the beam path between the photoelectric material and the receiving surface 13 of the optical conductor 3. However, it has emerged that the technical production devices, in particular that it is possible to achieve a high coupling efficiency without additional measures, predominate over this further optimization.

The device 1 according to the invention can be used to illuminate small bundle diameters. It is possible in this case by employing reflector configurations with multiple arms that open into a common end, to implement high luminances at this end point. It is also possible by using different LEDs, or LEDs of different color, to image arbitrary spectral combinations on the coupling region 16 of the luminous surface 13.

The advantages by comparison with the direct use of LEDs for illumination can be further extended by the device 1 according to the invention, it also being possible for the advantage of the spatial separation of the generation and use of light to be used in the case of requirement for higher light intensities or a higher efficiency of the light yield.

A higher light yield is also possible through the avoidance of additional optical components. In addition, there is a reduction in cost owing to a reduction in the dimensions of the components to be used in the device 1, in particular of the optical conductors 3.

Moreover, by combining the device 1 according to the invention with fiber optic components it is possible to render the configuration of the LEDs independent of the configuration of the useful light points. It is possible in this case to produce a simple LED matrix by mass production as a standardized light source. The LED matrix can be exchanged straightaway if required independently of the arrangement of the optical conductor ends that are employed as useful light and are disposed at the end of the optical conductor 3 opposite the coupling device 1.

Figure 3:
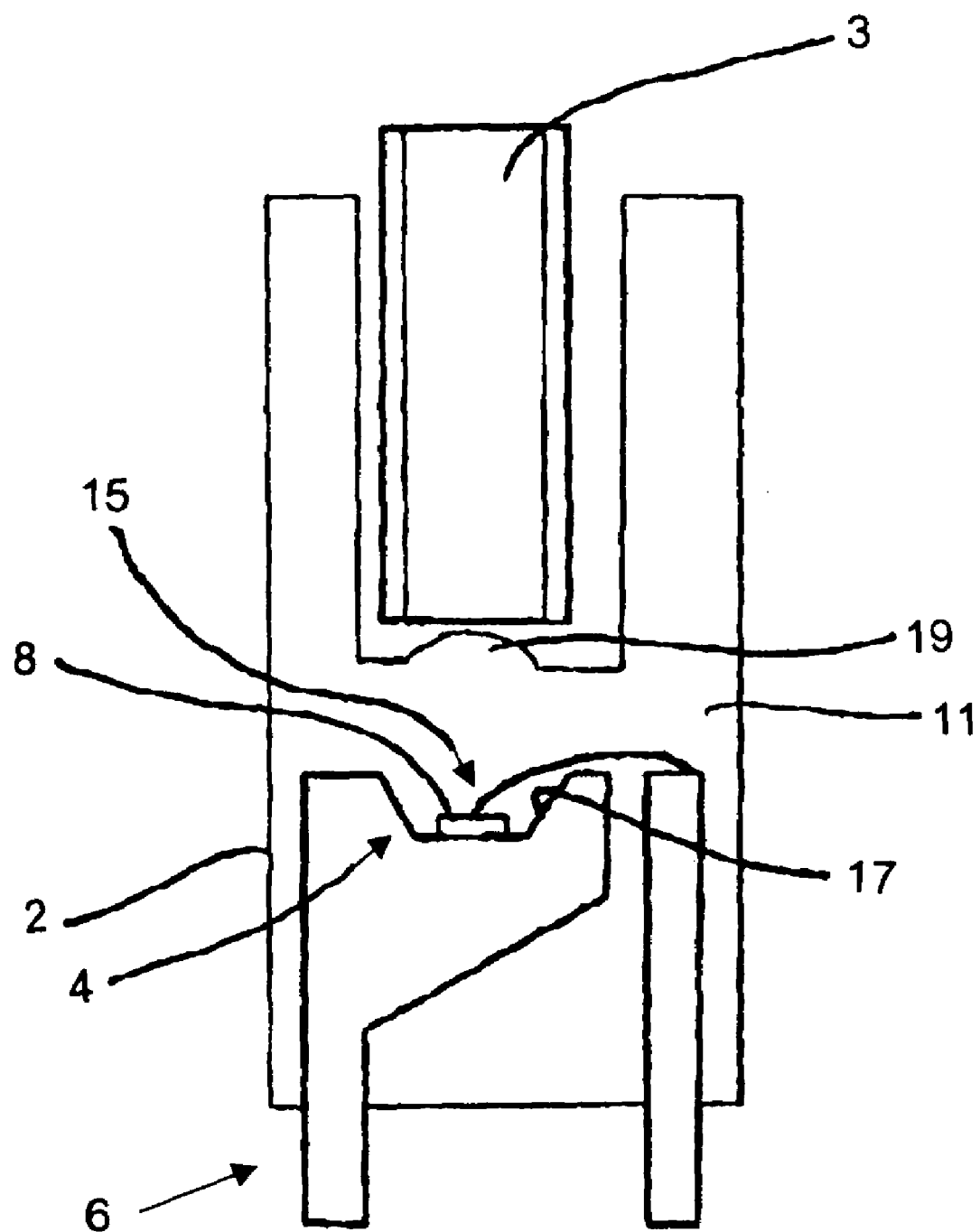
FIG. 3 is a diagrammatic illustration of the device according to the prior art.

FIG. 3 shows the device 1 for coupling the LEDs 2 to the optical conductor 3 according to the prior art. In this case, the light emitted by the light-emitting diode 2 is transmitted in a single glass fiber as the optical conductor 3. The interface between the LED 2 and the glass-fiber 3 is configured in this case such that a lens 19 that focuses the light into the optical conductor 3 is integrated into the plastic coating of the housing 11 via the luminous chip 8.

The drawing represents a standard LED from telecommunications engineering. Located at the bottom is the base 6 in which the luminous chip 8 is integrated in a funnel-shaped depression in the reflector 4. The light emitted by the luminous chip 8 is reflected at the reflecting surface 17, which is formed by the walls of the depression, such that the entire light emitted by the LED 2 is directed with the opening 15 of the reflector 4 at an aperture angle of approximately 150° full angle. A plastic layer is located at a distance above the depression. Located on the plastic layer is the plastic lens 19 that focuses the light incident in its region. The light focused by the lens 19 is then coupled into the optical conductor 3, which is seated directly above the lens 19.

It is not only a single glass fiber 3 that is illuminated by an LED in the illuminating technique, but an entire bundle of glass fibers that serve as the optical conductor 3. Use is made in this case either of individual LEDs 2 or interconnected LED clusters with additional lenses 19 or reflectors 4.

Substantial light losses are caused by the large spacing of the lens 19 from the reflector opening 15, the light being scattered into the housing 11 of the LED 2. Moreover, light losses also occur owing to the longer light path up to the luminous surface and/or the coupling region in the housing material.

These restrictions can be substantially reduced with the aid of the device 1 according to the invention in accordance with FIGS. 1 and 2.

I claim:

1. A device for coupling light into an optical conductor having a light receiving surface onto which light can be projected, the device comprising:
   an optical light element for generating the light, said optical light element containing:
      a light-guiding body functioning as a housing having a luminous surface, said luminous surface having a coupling region corresponding directly to the light receiving surface of the optical conductor and being free of additional optical elements;
      a reflector disposed in said housing, said reflector having a base rim in an immediate vicinity of said luminous surface and a reflecting surface for focusing the light onto at least one of said coupling region of said luminous surface of said housing and the light receiving surface of the optical conductor; a luminous chip formed of photoelectric material disposed in said reflector, said photoelectric material generating the light; and
      electric terminals for supplying power and disposed in said housing, one of said terminals being formed on a side opposite from said reflector and the other of said terminals being connected to said reflector by a bond wire running through a gap formed between said base rim and said luminous surface.

2. An optical device, comprising:
   an optical conductor having a light receiving surface onto which light can be projected; and
   an optical light element for generating the light transmitted to said optical conductor, said optical light element containing:
      a light-guiding body functioning as a housing having a luminous surface, said luminous surface having a coupling region corresponding directly to said light receiving surface of said optical conductor and being free of additional optical elements;
      a reflector disposed in said housing, said reflector having a base rim in an immediate vicinity of said luminous surface and having a reflecting surface for focusing the light onto at least one of said coupling region of said luminous surface of said housing and said light receiving surface of said optical conductor;
      a luminous chip formed of photoelectric material disposed in said reflector, said photoelectric material generating the light; and
      electric terminals for supplying power and disposed in said housing, one of said terminals being formed on a side opposite from said reflector and the other of said terminals being connected to said reflector by a bond wire running through a gap formed between said base rim and said luminous surface.

3. The device according to claim 2, wherein said reflecting surface of said reflector has a geometry by which the light emitted by said photoelectric material is projected at a predetermined angle onto at least one of said coupling region of said luminous surface and said light receiving surface of said optical conductor.

4. The device according to claim 2, wherein said reflecting surface of said reflector has a shape selected from the group of a parabolic shape and an elliptic shape.

5. The device according to claim 2, wherein:
   said reflector has an opening formed therein;
   said coupling region forms a substantially flat area corresponding to said opening of said reflector; and
   said light receiving surface of said optical conductor is disposed in a plane-parallel fashion relative to said coupling region.

6. The device according to claim 2, wherein said optical conductor has at least one optical fiber.

7. The device according to claim 2, wherein said optical conductor has a given diameter corresponding to an area of said coupling region.

8. The device according to claim 2, wherein said optical light element for generating the light is a light-emitting diode.

9. The device according to claim 6, wherein said optical fiber is formed from a material selected from the group consisting of glass and plastic.

10. The device according to claim 3, wherein said predetermined angle is an angle that is most favorable optically for reception in said optical conductor.

11. A light-emitting diode for use in an optical device, comprising:
   a base having electric terminals, one of said electric terminals being configured in an illuminating direction as a reflector having a reflecting surface and a base rim bounding said reflecting surface;
   a luminous chip formed of photoelectric material disposed in said reflector and connected to the other of said electric terminals via a bond wire; and
   an optically conducting body functioning as a housing connected to said base, said housing having a luminous surface and surrounding said photoelectric material, said luminous surface having a coupling region constructed at a smallest possible distance from said base rim;

said bond wire running through a gap formed between said base rim and said luminous surface.

12. The light-emitting diode according to claim 11, wherein said reflector has an opening formed therein and said coupling region is a flat area disposed parallel to said opening.

* * * * *